(12) United States Patent
Lau et al.

(10) Patent No.: US 11,719,589 B2
(45) Date of Patent: Aug. 8, 2023

(54) SYSTEMS AND METHODS FOR PRESSURE SENSOR ASSEMBLY INCLUDING IMPROVED ENCAPSULATION MATERIAL

(71) Applicant: DELPHI TECHNOLOGIES IP LIMITED, St. Michael (BB)

(72) Inventors: Jia luan Lau, Singapore (SG); Cheng Feng Lee, Singapore (SG)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 192 days.

(21) Appl. No.: 17/420,588

(22) PCT Filed: Dec. 19, 2019

(86) PCT No.: PCT/EP2019/086493
§ 371 (c)(1),
(2) Date: Jul. 2, 2021

(87) PCT Pub. No.: WO2020/141096
PCT Pub. Date: Oct. 9, 2020

(65) Prior Publication Data
US 2022/0082465 A1 Mar. 17, 2022

(30) Foreign Application Priority Data
Jan. 3, 2019 (SG) .......................... 10201900061T

(51) Int. Cl.
*G01L 19/14* (2006.01)
*G01L 9/00* (2006.01)
*G01L 23/24* (2006.01)

(52) U.S. Cl.
CPC .......... *G01L 19/147* (2013.01); *G01L 9/0041* (2013.01); *G01L 19/141* (2013.01); *G01L 23/24* (2013.01)

(58) Field of Classification Search
None
See application file for complete search history.

(56) References Cited

U.S. PATENT DOCUMENTS 5,998,243 A * 12/1999 Odashima ......... B29C 45/14655
438/126
7,014,888 B2 * 3/2006 McDonald ............ G01L 19/147
427/259

(Continued)

FOREIGN PATENT DOCUMENTS

CN 107240583 A 10/2017
DE 102005053876 * 5/2007

(Continued)

OTHER PUBLICATIONS

Office Action in Chinese Patent Application No. 201980087809.3 dated Oct. 10, 2022, with English translation (16 pages).

*Primary Examiner* — Lisa M Caputo
*Assistant Examiner* — Nigel H Plumb
(74) *Attorney, Agent, or Firm* — Joshua M. Haines; Bookoff McAndrews, PLLC

(57) ABSTRACT

A pressure sensor assembly includes an external housing unit; a sensor unit received within the external housing unit, the external housing unit has an external surface including a mounting surface; a sensing element mounted within the sensor unit and including a pressure-sensing surface; a substrate upon which the mounting surface is mounted; an air passage to enable air to impinge on the sensing element; and a filling passage, separate from the air flow passage, for the introduction of an encapsulation material onto the sensor unit, during assembly. The encapsulation material covers at least a part of the external surface of the sensor unit but does not cover the pressure-sensing surface of the sensing element which remains directly exposed to air within the air passage.

16 Claims, 2 Drawing Sheets

(56) References Cited

U.S. PATENT DOCUMENTS

| | | | |
|---|---|---|---|
| 7,207,226 B2* | 4/2007 | Wakasugi | G01L 23/24 |
| | | | 73/753 |
| 7,468,556 B2* | 12/2008 | Logan | G01L 19/141 |
| | | | 257/723 |
| 8,869,639 B2* | 10/2014 | Pohle | G01K 13/02 |
| | | | 73/866.5 |
| 2011/0138921 A1* | 6/2011 | Colombo | G01L 19/147 |
| | | | 73/706 |
| 2011/0138924 A1* | 6/2011 | Colombo | G01L 19/0092 |
| | | | 73/756 |
| 2013/0285167 A1 | 10/2013 | Otte et al. | |
| 2017/0284880 A1* | 10/2017 | Beer | H01L 23/49811 |
| 2018/0313709 A1* | 11/2018 | Chiou | B81B 7/0061 |

FOREIGN PATENT DOCUMENTS

| | | |
|---|---|---|
| DE | 102005053876 A1 | 5/2007 |
| JP | 2001201415 A | 7/2001 |
| JP | 2009047533 A | 3/2009 |

* cited by examiner

SYSTEMS AND METHODS FOR PRESSURE SENSOR ASSEMBLY INCLUDING IMPROVED ENCAPSULATION MATERIAL

CROSS REFERENCE TO RELATED APPLICATIONS

This application is a national stage application under 35 USC 371 of PCT Application No. PCT/EP2019/086493 having an international filing date of Dec. 19, 2019, which is designated in the United States and which claimed the benefit of SG Patent Application No. 10201900061T filed on Jan. 3, 2019, the entire disclosures of each are hereby incorporated by reference in their entirety.

FIELD OF INVENTION

The invention relates to the field of manifold absolute pressure (MAP) sensors for use in internal combustion engines. In particular, the invention relates to a pressure sensor assembly and a method of assembly of a pressure sensor assembly.

BACKGROUND

Manifold absolute pressure (MAP) sensors are used in internal combustion engines to assist with the timing of fuel injection. The MAP sensor measures the air pressure, with the information fed back to the engine control unit (ECU) and used in conjunction with sensors measuring the engine speed and air temperature to calculate the engine's air mass flow rate. The ECU can then calculate the required volume of fuel and carry out fuel injection at the appropriate time.

The sensor must be in fluidic communication with the air in the manifold as it relies on the curvature of a flexible membrane to function. The membrane separates two regions of different pressures, with the curvature related to the difference in pressure either side of the membrane. In a MAP sensor, the region contained within the sensor is held at a known pressure, with variations in the manifold pressure causing the curvature of the membrane to change. This changes the resistance of the membrane, creating a change in the voltage across the membrane that is communicated to the ECU, which calibrates the voltage received to calculate the pressure difference across the membrane and hence the pressure in the manifold.

It is against this background that the invention has been devised.

STATEMENTS OF INVENTION

According to a first aspect of the invention, there is provided a pressure sensor assembly for measuring the pressure of air in a compression ignition internal combustion engine, the pressure sensor comprising an external housing unit; a sensor unit received within the external housing unit, the sensor housing unit comprising an exterior surface including a mounting surface; a sensing element mounted within the sensor unit and comprising a pressure-sensing surface; a substrate (e.g. PCB) upon which the mounting surface is mounted; an air passage to enable air to impinge on the sensing element, in use; and a filling passage, separate from the air passage, to enable the introduction of an encapsulation material onto the sensor unit, during assembly. The encapsulation material covers at least a part of the external surface of the sensor unit but does not cover the pressure-sensing surface of the sensing element which remains directly exposed to air within the opening.

Optionally, the sensor assembly may be a manifold absolute pressure (MAP) sensor assembly for measuring the pressure of air in the intake manifold of the engine.

Typically, MAP sensors utilise two different encapsulation materials to fill the space between the external housing unit and sensor unit. One is typically a foam, or other suitable low density, low viscosity material that covers the entirety of the external surface of the sensor unit except the mounting surface. The second material is often much more dense and viscous and fills the remaining space between the sensor unit and external housing unit. The foam allows the sensing element to remain sufficiently in communication with the air in the air passage to measure the pressure therein, which would not be the case if the denser material covered the sensing element.

Through careful selection of encapsulation material in the invention, it is possible to use only one encapsulation material, which greatly simplifies assembly of the MAP sensor assembly. The reduction in the number of parts also helps reduce costs associated with the MAP sensor assembly. Additionally, since the pressure-sensing surface is in direct communication with the air in the air passage, rather than in communication with said air via foam, a more accurate measurement of the pressure inside the intake manifold can be taken.

Optionally, at least one of the filling passage and the air passage is provided in the external housing unit.

For example, the pressure-sensing surface may be defined in an upper surface of the sensor unit opposed to the mounting surface.

A region of the external surface of the sensor unit may surround the sensing element and this region is not covered with encapsulation material.

Optionally, the external housing unit defines, together with the upper surface of the sensor unit, a clearance. The clearance may be at least partly filled with encapsulation material. The clearance is typically between 0.2 and 0.3 mm.

Ingress of the encapsulation material into the clearance is controlled by the size of the clearance and the viscosity of the encapsulation material. A larger clearance would require a more viscous encapsulation material as otherwise the encapsulation material would flow over the sensing element, thus preventing the MAP sensor assembly from functioning.

Typically, the encapsulation material has a viscosity in the range of 70,000-90,000 centipoise (cP) (70-90 Pa·s) with, for example, a clearance of between 0.2 mm and 0.3 mm. The encapsulation material is typically a self-levelling adhesive.

According to a second aspect of the invention, there is provided a method of encapsulating a sensor unit in a pressure sensor assembly for an internal combustion engine. The pressure sensor assembly comprises an external housing unit for the sensor unit, the sensor unit comprising a sensing element defining a pressure-sensing surface. The method comprises providing an air passage for the sensor unit to enable an airflow to be applied to the pressure-sensing surface, in use, mounting a mounting surface of the sensor unit on a substrate to leave at least a part of an external surface of the sensor unit exposed including a pressure-sensing surface of a sensing element of the sensor unit; providing a filling passage, separate from the air flow passage, and introducing an encapsulation material through a first filling opening of a filling passage so that the encapsulation material surrounds the exposed external surface of the sensor unit but excluding the pressure-sensing surface of the sensing element which remains directly exposed to air within an air passage.

The method may further comprise curing the encapsulation material after it has been introduced through the filling passage.

The method may comprise introducing the encapsulation material into a clearance between the external housing and the sensor unit so that the encapsulation material surrounds an exposed external surface of the sensor unit, but excluding the pressure-sensing surface of the sensing element which remains directly exposed to air within the air passage, in use.

The method may comprise selecting the viscosity of the encapsulation material so that the introduced encapsulation material does not extend so far into the clearance as to cover the pressure-sensing surface when it is introduced into the filling passage, in use.

By way of example, the method may comprise selecting the viscosity of the encapsulation material in the range of 70,000 and 90,000 cP.

The method allows the sensor unit to be encapsulated in a convenient manner by introduction of the encapsulation material through a dedicated passage which only serves the purpose of carrying the encapsulation to the sensor unit surface, and in such a way that the pressure-sensing surface remains exposed. The method does not require any parts to be removed after the encapsulation process is complete, which provides advantages.

It will be appreciated that preferred and/or optional features of the first aspect of the invention may be incorporated alone or in appropriate combination in the second aspect of the invention.

BRIEF DESCRIPTION OF THE DRAWINGS

The above and other aspects of the invention will now be described, by way of example only, with reference to the accompanying drawings, in which.

SPECIFIC DESCRIPTION

Figure 1:
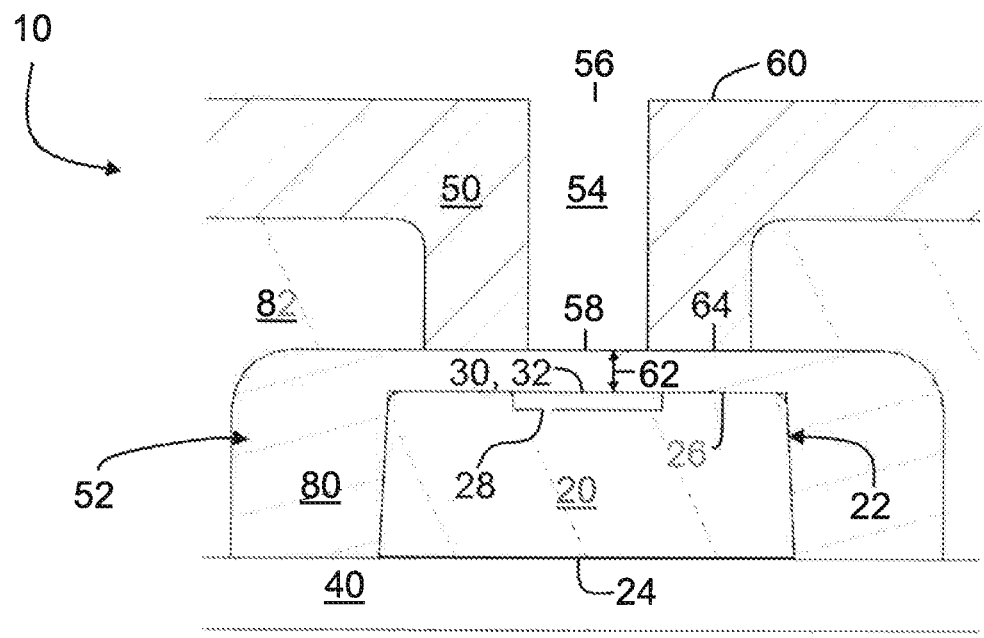
FIG. 1 is a cross sectional view of a manifold absolute pressure sensor in accordance with the current state of the art.

With reference to FIG. 1, in the current state of the art, a manifold absolute pressure (MAP) sensor assembly 10 consists of a sensor unit 20, a substrate in the form of a printed circuit board (PCB) 40 and an external housing unit 50. The MAP sensor assembly would typically be located inside the intake manifold (not shown) of an internal combustion engine. The sensor unit 20 comprises an external surface 22 including a mounting surface 24 for mounting the sensor unit 20 onto the PCB 40 and an upper surface 26. The sensor unit 20 additionally comprises a sensing element 28 located in the centre of the upper surface 26 of the sensor unit 20. The sensing element 28 comprises a pressure-sensing surface 30 in the form of a flexible membrane 32 in communication with the pressure inside the sensor unit 20, which is calibrated to a known value, and the pressure external to the sensor unit 20. The flexible membrane 32 may commonly be made of silicon.

The external housing unit 50 is mounted on the PCB 40 in such a way that a cavity 52 is defined in the space between the walls of the external housing unit 50, the PCB 40 and the sensor unit 20. Included in the external housing unit 50 is an air passage 54 having a first air opening 56 in fluidic communication with the environment external to the external housing unit 50, in this case the environment inside the intake manifold, and a second air opening 58 in fluidic communication with the environment inside the cavity 52. The air passage 54 is located approximately centrally in an upper surface 60 of the external housing unit 50 such that the second air opening 58 is directly vertically above the pressure-sensing surface 30 of the sensing element 28 of the sensor unit 20. There is provided a small clearance 62 between a lower surface 64 of the external housing unit 50 and the upper surface 26 of the sensor unit 20 in the region of the sensing element 28.

The cavity 52 is filled by two materials. A foam 80 surrounds the external surface 22 of the sensor unit 20, excluding the mounting surface 24 and also fills the clearance 62 between the upper surface 26 of the sensor unit 20 and the air passage 54 and the lower surface 64 of the external housing unit 50 but does not enter the air passage 54 itself. The remainder of the cavity 52 is filled by a potting 82, which is much denser and viscous then the foam 80.

The foam 80 is of sufficiently low density and viscosity that the pressure-sensing surface 30 of the sensing element 28 is still able to measure the pressure in the air passage 54 and hence the intake manifold. If, instead of the foam 80, the potting 82 covered the sensing element 28, the viscosity of the potting 82 would prevent such a measurement taking place. The covering of the external surface 22 of the sensor unit 20 by the foam 80 is therefore of critical importance to MAP sensor assemblies 10 in the current state of the art.

To assemble the MAP sensor assembly 10, the mounting surface 24 of the sensor unit 20 is affixed to the PCB 40 and then turned upside-down and hand-dipped in the foam 80 to cover the remainder of the external surface 22 of the sensor unit 20. The external housing unit 50 is then affixed to the assembly, with the potting 82 then added to fill the remaining cavity space 52. The manufacturing process is inconvenient and does not lend itself to good repeatability, which is a problem given the critical nature of the coverage of the external surface 22 of the sensor unit 20 by the foam 80.

Figure 2:
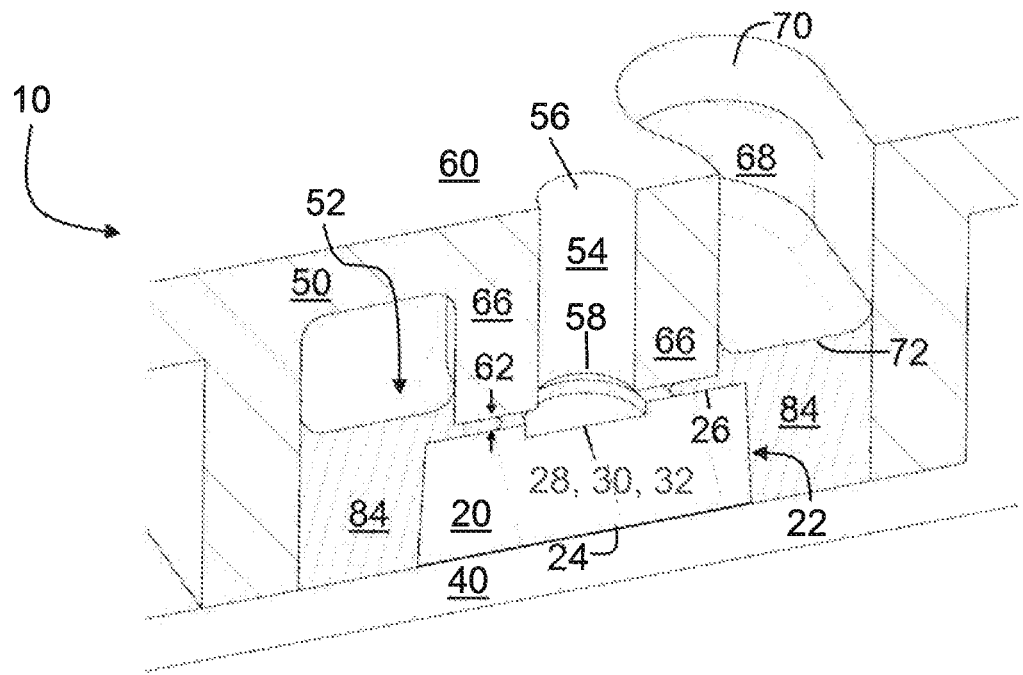
FIG. 2 is a perspective view of a manifold absolute pressure sensor assembly in accordance with an embodiment of the invention.
Figure 3:
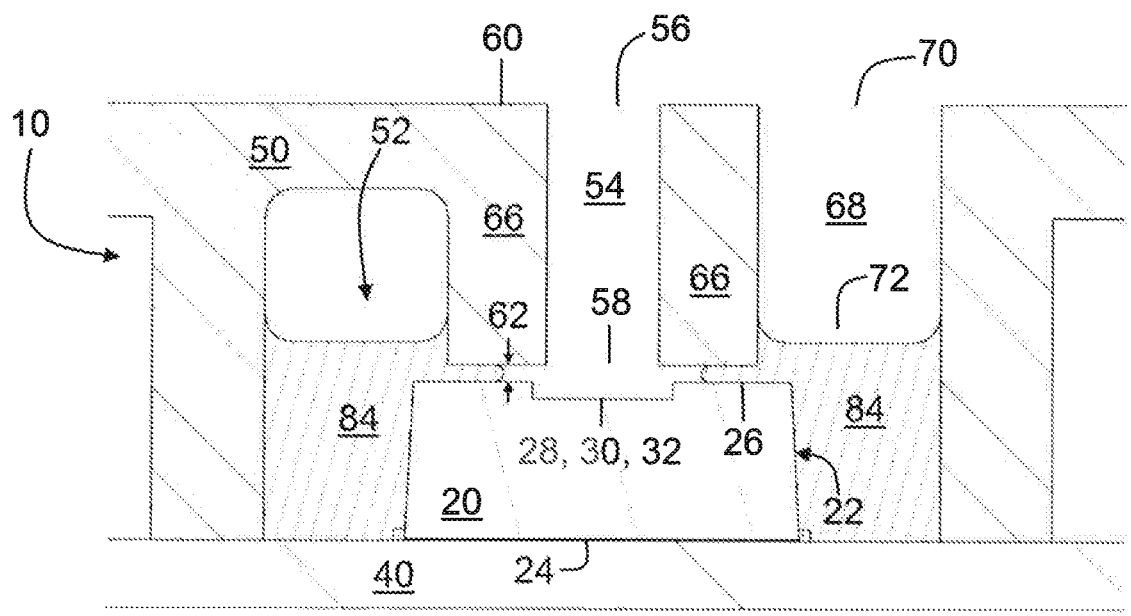
FIG. 3 is a cross sectional view of the manifold absolute pressure sensor of FIG. 2.

With reference to FIGS. 2 and 3, in an embodiment of the invention, there is provided a MAP sensor assembly 10 comprising a sensor unit 20, a substrate in the form of a PCB 40 and an external housing unit 50. The embodiment of the invention shares a number of similar features to the prior art, which shall be referred to by the same reference numerals for the sake of clarity. The sensor unit 20 comprises an external surface 22 including a mounting surface 24 for mounting the sensor unit 20 onto the PCB 40 and an upper surface 26. The sensor unit 20 additionally comprises a sensing element 28 located in the centre of the upper surface 26 of the sensor unit 20. The sensing element 28 comprises a pressure-sensing surface 30 in the form of flexible membrane 32 in communication with the pressure inside the sensor unit 20, which is calibrated to a known value, and the pressure external to the sensor unit 20. The flexible membrane 32 may commonly be made of silicon.

The external housing unit 50 is mounted on the PCB 40 in such a way that a cavity 52 is defined in the space between the walls of the external housing unit 50, the PCB 40 and the sensor unit 20. The internal structure of the external housing unit 50 includes a central turret 66 extending vertically downwards from the upper surface 60 of the external housing unit 50 to a point just above the upper surface 26 of the sensor unit 20, thus defining a clearance 62 between the bottom of the central turret 66 and the sensor unit 20. Included in the external housing unit 50 is an air passage 54 having a first air opening 56 in fluidic communication with the environment external to the external housing unit 50, in this case the environment inside the intake manifold, and a second air opening 58 in fluidic communication with the environment inside the cavity 52. The first air opening 56 is located in the centre of the upper surface 60 of the external housing unit 50 and the air passage 54 passes vertically through the central turret 66 such that the second air opening 58 is directly vertically above the pressure-sensing surface 30 of the sensing element 28 of the sensor unit 20, separated by the clearance 62.

The external housing unit 50 additionally includes a filling passage 68, separate from the air passage 54, that passes vertically through the external housing unit 50 in a region not including the central turret. The filling passage 68 has a first filling opening 70, located on the upper surface 60 of the external housing unit 50 and in fluidic communication with the environment external to the MAP sensor assembly 10, and a second filling opening 72, located such that it is in fluidic communication with the environment inside the cavity 52. The air passage 54 is adjacent to and separate from the filling passage 68 in the external housing unit 50 so that both passages open into the cavity defined within the external housing unit 50 in close proximity with one another.

The filling passage 68 enables an encapsulation material 84, in the form of a self-levelling adhesive to be introduced to the first filling opening 70 of the filling passage 68. The encapsulation material 84 flows through the filling passage 68 and into the cavity 52 via the second filling opening 72. The encapsulation material 84 fills the cavity 52, surrounding the external surface 22 of the sensor unit 20 with the exception of the mounting surface 24. Ingress of the encapsulation material 84 into the clearance 62 between the central turret 66 and the sensor unit 20 is limited by its viscosity such that the sensing element 28 and a small region of the upper surface 26 of the sensor unit 20, surrounding the sensing element 28 remain uncovered. This ensures that the pressure-sensing surface 30 of the sensing element 28 remains directly exposed to air in the air passage 54 and can therefore measure the pressure in the intake manifold without the need for a foam. In other words, the air flow into the air passage has an uninterrupted path to the pressure-sensing surface 30, with no intermediate medium being present between the air flow and the pressure-sensing surface 30.

Of course, it is not possible to fill the cavity 52 through the air passage because it would then be very difficult for the pressure sensing surface 30 to remain uncovered and directly exposed to air when the sensor assembly 10 is used, and hence it is necessary to include the additional filling passage 68.

Measurements are benefited by the direct exposure of the pressure-sensing surface 30 to air in the air passage. A suitable range for the viscosity of such an encapsulation material 84 is envisaged to be between 70,000 and 90,000 centipoise (cP) (70-90 Pa·s) for a clearance of between 0.2 mm and 0.3 mm More typically, the viscosity may be in the range of 75,000 to 85,000 cP, or may be around 75,000 to 80,000 cP.

In use, the MAP sensor assembly 10 is used to measure the air pressure inside the intake manifold. Air inside the intake manifold is in fluidic communication with the air passage 54 and therefore in communication with the pressure-sensing surface 30 of the sensing element 28. The pressure-sensing surface 30 is also in communication with the interior of the sensor unit 20, the pressure wherein being calibrated to be held at a constant known value. Differences between the pressure inside the sensor unit 20 and inside the intake manifold cause a curvature of the flexible membrane 32, which changes as the pressure in the intake manifold fluctuates. Changes in the curvature of the flexible membrane 32 lead to changes in its resistance, leading to changes in the voltage across it. This voltage change is communicated to the ECU (not shown), which calibrates the voltage received to calculate the pressure difference across the flexible membrane 32 and hence the pressure in the intake manifold.

In an embodiment of the invention, there is provided a method of assembly of a MAP sensor assembly 10. A mounting surface 24 of a sensor unit 20 is affixed to a substrate in the form of a PCB 40 such that its sensing element 28, located on an upper surface 26 of the sensor unit 20 is on the opposite face to the mounting surface 24. An external housing unit 50 is then also affixed to the PCB 40 such that a second air opening 58 of a vertical air passage 54 lies directly above a pressure-sensing surface 30 of the sensing element 28 of the sensor unit 20. The space between the external housing unit 50, the PCB 40 and the sensor unit 20 defines a cavity 52 into which a volume of an encapsulation material 84 in the form of a self-levelling adhesive is dispensed via a filling passage 68. The encapsulation material 84 is injected into a first filling opening 70 and flows through the filling passage 68, entering the cavity 52 via a second filling opening 72. The temperature of the encapsulation material 84 at injection is typically 25° C. but may, for example, be anywhere in the range 20° C. to 30° C.

Following injection, the encapsulation material 84 undergoes a curing process following the guidance of the recommendation of the vendor of the encapsulation material. Typically this may be heating the encapsulation material to 125° C. for one hour but could involve a multi-step curing process or heating to any temperature between, for example, 110° C. and 140° C. for anywhere between, for example, 50 and 70 minutes.

The relationship between the various injection parameters, such as those listed above and also the viscosity of the encapsulation material 84 and the clearance 62 between a central turret 66 of the external housing unit 50 and an upper surface 26 of the sensor unit 20 is crucial in limiting the ingress of encapsulation material 84 into the clearance 62, which is in turn critical to ensuring that the pressure-sensing surface 30 of the sensing element 28 remains directly exposed to air in the air passage 54 and able to measure the pressure in the intake manifold. It should therefore be appreciated that other combinations these parameters may be used to the same effect without departing from the scope of this invention.

It will be appreciated by a person skilled in the art that the invention could be modified to take many alternative forms to that described herein, without departing from the scope of the appended claims. For example, the first air opening does not need to be located in the centre of the upper surface of the external housing unit, nor does the air passage need to pass vertically through the external housing unit, as long as the second air opening is directly above the pressure-sensing surface of the sensing element.

References used:
10—manifold absolute pressure sensor assembly
20—sensor unit
22—external surface
24—mounting surface 26—upper surface
28—sensing element
30—pressure-sensing surface
32—flexible membrane
40—PCB
50—external housing unit
52—cavity
54—air passage
56—first air opening
58—second air opening
60—upper surface of the external housing unit
62—clearance
64—lower surface of the external housing unit
66—central turret
68—filling passage
70—first filling opening
72—second filling opening
80—foam
82—potting
84—encapsulation material

The invention claimed is:

1. A pressure sensor assembly for measuring pressure of air in a compression ignition internal combustion engine, the pressure sensor assembly comprising:
an external housing unit;
a sensor unit received within the external housing unit, the sensor unit comprising an external surface including a mounting surface;
a sensing element mounted within the sensor unit and comprising a pressure-sensing surface;
a substrate upon which the mounting surface is mounted;
an air passage which enables impingement of air on the sensing element, in use; and
a filling passage, separate from the air passage, which introduces an encapsulation material onto the sensor unit, during assembly;
wherein the encapsulation material covers at least a part of the external surface of the sensor unit but does not cover the pressure-sensing surface of the sensing element which remains directly exposed to air within the air passage.

2. The pressure sensor assembly as claimed in claim 1, wherein the pressure sensor assembly is a manifold absolute pressure sensor assembly which measures the pressure of air in the intake manifold of the engine.

3. The pressure sensor assembly as claimed in claim 1, wherein at least one of the filling passage and the air passage is provided in the external housing unit.

4. The pressure sensor assembly as claimed in claim 3, wherein the air passage and the filling passage are adjacent to one another in the external housing unit.

5. The pressure sensor assembly as claimed in claim 1, wherein the pressure-sensing surface is defined in an upper surface of the sensor unit opposed to the mounting surface.

6. The pressure sensor assembly as claimed in claim 5, wherein a region of the external surface of the sensor unit surrounds the sensing element and wherein the region surrounding the sensing element is not covered with the encapsulation material.

7. The pressure sensor assembly as claimed in claim 5, wherein the external housing unit defines, together with the upper surface of the sensor unit, a clearance.

8. The pressure sensor assembly as claimed in claim 7, wherein the clearance is at least partly filled with the encapsulation material.

9. The pressure sensor assembly as claimed in claim 7, wherein the clearance is between 0.2 and 0.3 mm.

10. The pressure sensor assembly as claimed in claim 1, wherein the encapsulation material has a viscosity in a range of 70,000 to 90,000 cP.

11. The pressure sensor assembly as claimed in claim 1, wherein the encapsulation material is a self-levelling adhesive.

12. A method of encapsulating a sensor unit in a pressure sensor assembly for a compression ignition internal combustion engine, the pressure sensor assembly comprising an external housing unit for the sensor unit, the sensor unit comprising a sensing element defining a pressure-sensing surface, the method comprising;
providing an air passage for the sensor unit which enables an airflow to be applied to the pressure-sensing surface, in use;
mounting a mounting surface of the sensor unit on a substrate to leave at least a part of an external surface of the sensor unit exposed including a pressure-sensing surface of a sensing element of the sensor unit;
providing a filling passage, separate from the air flow passage; and
introducing an encapsulation material through the filling passage so that the encapsulation material surrounds the external surface of the sensor unit which is exposed but excluding the pressure-sensing surface of the sensing element which remains directly exposed to air within an air passage.

13. The method as claimed in claim 12, further comprising curing the encapsulation material after it has been introduced through the filling passage.

14. The method as claimed in claim 12, further comprising introducing the encapsulation material into a clearance between the external housing unit and the sensor unit, so that the encapsulation material surrounds an exposed external surface of the sensor unit but excluding the pressure-sensing surface of the sensing element which remains directly exposed to air within the air passage, in use.

15. The method as claimed in claim 12, further comprising selecting the viscosity of the encapsulation material so that the introduced encapsulation material does not extend so far into the clearance as to cover the pressure-sensing surface when it is introduced into the filling passage.

16. The method as claimed in claim 15, wherein the encapsulation material has a viscosity in a range of 70,000 to 90,000 cP.

* * * * *